United States Patent
Carpenter et al.

(10) Patent No.: US 8,250,375 B2
(45) Date of Patent: Aug. 21, 2012

(54) GENERATING UNIQUE DATA FROM ELECTRONIC DEVICES

(75) Inventors: Todd L. Carpenter, Monroe, WA (US); William J. Westerinen, Sammamish, WA (US); Vladimir Sadovsky, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 806 days.

(21) Appl. No.: 12/110,172

(22) Filed: Apr. 25, 2008

(65) Prior Publication Data

US 2009/0319799 A1 Dec. 24, 2009

(51) Int. Cl.
*G06F 11/30* (2006.01)
*H04L 9/00* (2006.01)
*H04L 9/08* (2006.01)

(52) U.S. Cl. .......... 713/189; 380/284; 380/44; 380/264
(58) Field of Classification Search .................. 713/189; 380/44, 264, 284
See application file for complete search history.

(56) References Cited

U.S. PATENT DOCUMENTS

| | | | |
|---|---|---|---|
| 5,489,908 A * | 2/1996 | Orthmann et al. | 340/10.32 |
| 5,623,637 A | 4/1997 | Jones et al. | |
| 6,075,858 A | 6/2000 | Schwartzman | |
| 6,230,267 B1 | 5/2001 | Richards et al. | |
| 6,457,126 B1 | 9/2002 | Nakamura et al. | |
| 6,683,954 B1 | 1/2004 | Searle | |
| 7,191,340 B2 * | 3/2007 | Wuidart et al. | 713/189 |
| 2002/0099824 A1 * | 7/2002 | Bender et al. | 709/225 |
| 2005/0036610 A1 * | 2/2005 | Krell et al. | 380/44 |
| 2006/0015751 A1 * | 1/2006 | Brickell et al. | 713/193 |
| 2007/0165844 A1 | 7/2007 | Little | |
| 2007/0165864 A1 | 7/2007 | Nagase et al. | |
| 2007/0195957 A1 | 8/2007 | Arulambalam et al. | |
| 2007/0198856 A1 | 8/2007 | Lee et al. | |
| 2007/0211551 A1 * | 9/2007 | Yogev et al. | 365/226 |
| 2007/0223704 A1 | 9/2007 | Brickell et al. | |
| 2009/0154244 A1 * | 6/2009 | Shiga | 365/185.11 |
| 2009/0165086 A1 * | 6/2009 | Trichina et al. | 726/2 |
| 2009/0176480 A1 * | 7/2009 | Jones et al. | 455/411 |

OTHER PUBLICATIONS

Authenex Inc. A-Key USB Token Technology http://www.infosource.com.tw/products-tech-doc/content/authenex/Tokens/Authenex_Inc_A-Key_Technology.pdf. Last accessed Oct. 26, 2007, 7 pages.

T. W. Arnold, et al. The IBM PCIXCC: A new cryptographic coprocessor for the IBM Journal of Research and Development, vol. 48, No. 3/4, 2004. DOI: 10:147/rd.483.0475, Internet publication Apr. 6, 2004. http://www.research.ibm.com/journal/rd/483/arnold.html. Last accessed Oct. 26, 2007, 13 pages.

* cited by examiner

*Primary Examiner* — Carl Colin
*Assistant Examiner* — Peter Shaw
(74) *Attorney, Agent, or Firm* — Lee & Hayes, PLLC (57) ABSTRACT

Providing for analysis of artifacts of electronic devices to generate data that is substantially unique to a particular device or to a class of devices is described herein. In some aspects, analyzed artifacts are chosen based on reliable reproducibility of such data over many analyses. The substantially unique data can be associated with a particular electronic device(s) to distinguish such devices from other devices. In some aspects, the generated data is first transformed into an identifier, such as a number, word, string of data, etc., to distinguish the electronic device in remote communication, to provide a key in an encryption/decryption algorithm, and so on. The data can be reproduced by reanalyzing the artifacts, and thus need not be stored for future consumption, mitigating risks involved in storing sensitive data.

16 Claims, 10 Drawing Sheets

GENERATING UNIQUE DATA FROM ELECTRONIC DEVICES

BACKGROUND

Unique or substantially unique data can be utilized in many electronic applications. For instance, random numbers can be utilized for identifying electronic devices on a network, or in conjunction with data exchange with other such devices. Further, random numbers or similar unique data can be employed as a key(s) of an encryption algorithm to encrypt and decrypt data. By employing unique data, collision occurrences, where two devices are indistinguishable on a network, or where duplicate keys exist to encrypt/decrypt data, are mitigated or avoided.

Various methods are utilized to generate unique data. One typical method is random number generation that employs a random number algorithm and/or hardware device. Such device/algorithm can be utilized to generate substantially unique numbers as applied to a particular entity, architecture, system, or the like (the degree of uniqueness often being dependent upon a number of digits, or size, of the random number). The random numbers can be binary, decimal, hexadecimal, and so on. Examples of unique or substantially unique data utilized in network communications are Internet Protocol (IP) addresses, which are substantially unique to a particular device as seen by the Internet, or media access control (MAC) addresses, which are substantially unique to networked electronic devices. Unique identifying information, like IP addresses and MAC addresses, can be an important aspect of electronic network communication, enabling devices to be distinguished from one another. Just as a mailing address must be distinguishable in order for mail to reliably arrive at a mailing destination, electronic devices must be distinguishable in order for data to reliably arrive at a network destination.

With regard to other applications such as data transformation, random numbers can be utilized as keys to encrypt and/or decrypt data. A decryption/encryption algorithm can transform data and render such data substantially impossible to understand without a proper key. The key then, becomes the primary mechanism for securing encrypted data utilizing such algorithms. Those who have the key can decrypt the data, those who do not, are typically unable to do so.

Keys vary in the security they provide, however, based on their difficulty to reproduce. The more difficult it is to regenerate a key, the less likely that encrypted data is subject to unauthorized access. Thus, a random number having many digits, such as 64, 128, 256 digits, and so on, can provide additional security as compared with a random number having smaller digits. As an example, modern computers can attempt to decrypt information by discovering the key. Some methods of discovering keys include 'brute force' methods, where all values for a given key domain range are input into encryption/decryption algorithms until an output is received that makes sense. Other 'smarter' methods are utilized as well, which can reduce time required to 'break' encrypted data as compared with brute force methods. Thus, to ensure security of encrypted data, it is important to develop encryption mechanisms to counteract developing attempts to break encryption.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject disclosure provides for analyzing artifacts of electronic devices to generate values that are substantially unique to a particular device or to a class of devices. In some aspects, analyzed artifacts are chosen on an ability to produce reliably repeatable values over many analyses. The substantially unique values can be associated with the electronic device(s) to distinguish such devices from other devices. In some aspects, a generated value is first transformed into an identifier, such as a number, word, string of data, etc., before it is associated with an electronic device. The identifier can then be utilized to distinguish the electronic device in remote communication, as a key in an encryption/decryption algorithm, and so on.

According to particular aspects, generating unique data that can be reliably reproduced from electronic and/or mechanical artifacts of the device is provided. The unique data is utilized to generate an encryption/decryption key(s) or communication identifier unique to the device or a class of devices. The unique data is reproduced each time such data is needed. Accordingly, the unique data need not be stored in memory, rendering such data less susceptible to unauthorized access. The data can be used for an internal process of the device (e.g., master encryption), provided to a recipient device (e.g., shared encryption), or both (e.g., a master key used to secure shared keys). According to such aspects, increased security for encryption keys and other sensitive data applications can be provided by circumventing a need to store sensitive data in memory.

According to one or more other aspects, a random seed generator can provide randomized data that can be utilized in conjunction with non-unique values determined from electronic device artifacts. For instance, some artifacts can produce values common to a class of devices, rather than unique to each device. In such case, a transformation algorithm can be employed to identify a substantially random arrangement of device artifacts (e.g., a subset of memory cell blocks of flash memory device) from the randomized data. Analysis of an artifact (e.g., flash memory cell read/write/access time) that is not unique in some circumstances (e.g., applied to similar blocks of memory) can be applied to the arrangement of device artifacts (e.g., random selection of memory blocks) to generate a value or set of values substantially unique to the particular device. The randomized seed data providing the arrangement of artifacts can be stored, and utilized to regenerate the unique values/sets of values on demand.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter can be practiced without these specific details. In other instances, well-known structures and devices are shown in block diagram form in order to facilitate describing the claimed subject matter.

As used in this application, the terms "component," "module," "system", "interface", "engine" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components, and can be as simple as a command line or a more complex Integrated Development Environment (IDE).

Generation and application of substantially unique data (e.g., unique or near-unique to a particular class of entities, such as networked computers) is commonly utilized for modern electronic devices. Employing unique keys to encrypt/decrypt data is one example; reliable transfer of data among multiple networked devices is another. In many circumstances, unique data is generated using random number algorithms. Such algorithms can be useful in that they can generate data having very low likelihood of collision (e.g., where more than a single number or string of data performs a unique function, or where a single number or sting of data represents multiple unique entities). By minimizing collision likelihood, inadvertent collisions are also minimized and deliberate collisions (e.g., hacking encrypted data) are rendered more difficult.

One problem with number generation is that such numbers are not repeatable. The algorithms are designed to minimize number/data collision within a particular application by employing a mechanism that is designed to be very difficult to repeat. Accordingly, in order to utilize the same number for a particular application, such as a networking address, the number must be stored for subsequent use.

Although storing substantially unique data can be useful to re-use device identification data, it can pose security risks in some applications. For instance, an encryption key retained in persistent storage at a device can potentially be extracted or accessed by an unauthorized entity if such entity obtains control of the device or obtains access to the persistent storage. Accordingly, employing a mechanism where unique data does not have to be stored in memory, or can be stored in non-persistent storage (e.g., volatile memory, non-volatile memory configured for periodic deletion) can provide significant security advantages for sensitive applications.

The subject disclosure provides for, in one or more aspects, generating unique or substantially unique data based on reliably repeatable artifacts of an electronic device. Furthermore, such artifacts or analyzed values based thereon can be substantially unique to a particular device or class of devices. Accordingly, data can be reliably re-generated as needed instead of storing the data (or at least a portion thereof) in memory.

As a particular non-limiting example to illustrate the foregoing, a read time or write time of a memory device (e.g., non-volatile memory such as flash, volatile memory such as dynamic random access memory [DRAM], and so on) can reliably (e.g., for 50 million read/writes) be within a relatively tight tolerance. Furthermore, the read time or write time can be substantially different (e.g., distinguishably outside the tolerance) than another similar device (e.g., another flash memory module). Such can be the case even where the flash memory is part of an identical class or model of flash memory devices provided by a common manufacturer. As a more specific example, electronic function of a transistor-based memory cell or block of such cells can be substantially unique to the cell/block of cells. Accordingly, even the identical function performed on other transistor-based memory cells/blocks of cells of the same device can provide distinguishably different results in substantially all cases. As another example, results of a function of a memory controller (e.g., cell access time) can be substantially the same for many or all cells/blocks of one memory device, but distinguishably different from controller to controller. Accordingly, the results of the function can be substantially unique to each flash memory device.

Where substantially unique data can be reliably and repeatably generated from an artifact of a device, the data can be utilized for security and/or communication, without storing the data in persistent storage. If used as an encryption/decryption key, the data can be regenerated (e.g., by re-analyzing the artifact of the device) upon request of an authorized application. The application can be employed at the device where the unique data is generated, or at another authorized device (e.g., a networked device). In other applications, such as communication, secure data utilized to distinguish a device for data exchange can be regenerated when another device requests distinguishing data. Accordingly, a risk that secured data, stored in persistent device memory (or, e.g., memory associated with the device), is accessed through physical control of a device can be reduced or avoided.

It should be appreciated that, as described herein, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). The aforementioned carrier wave, in conjunction with transmission or reception hardware and/or software, can also provide control of a computer to implement the disclosed subject matter. Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the amended claims, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
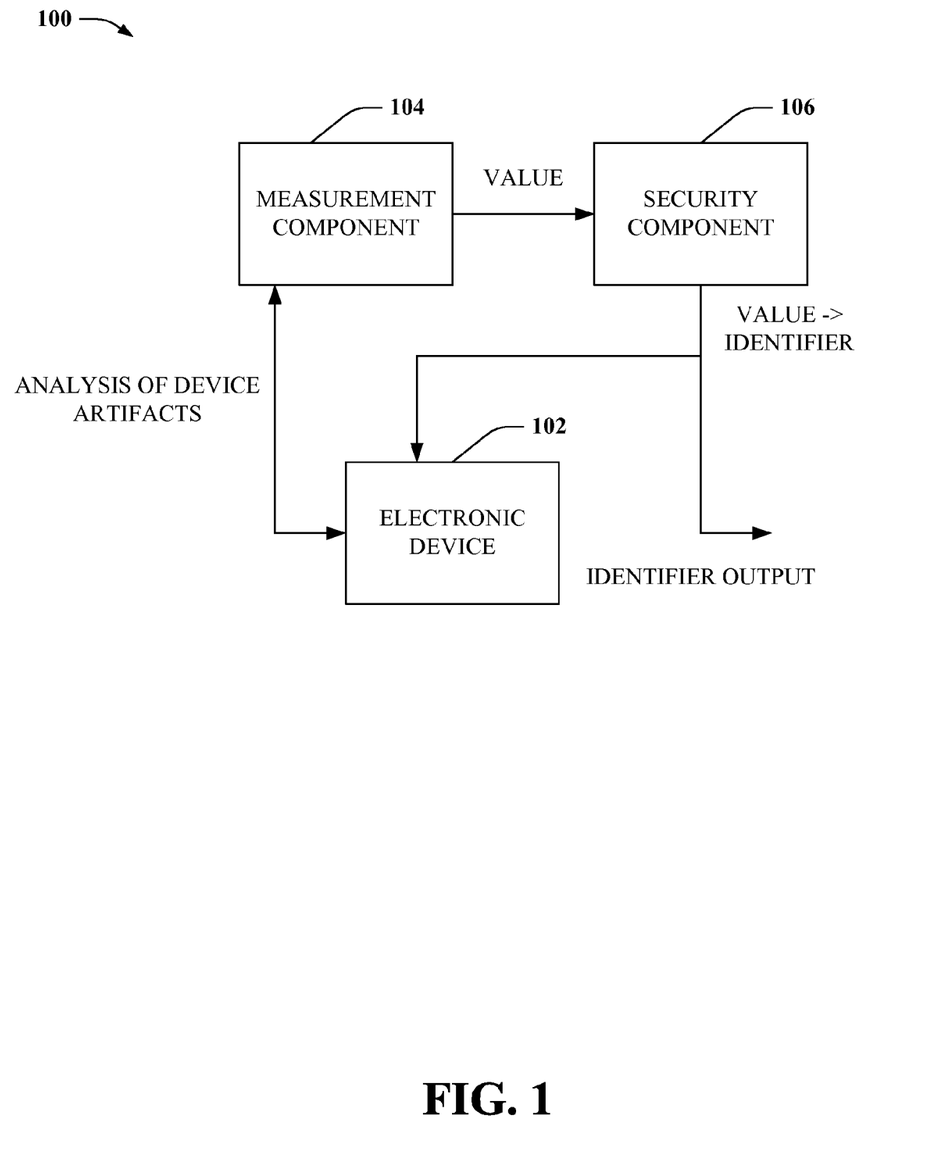
FIG. 1 depicts a block diagram of an example system that provides substantially unique data based on analysis of artifacts of an electronic device.

Referring now to the drawings, FIG. 1 depicts a block diagram of an example system that generates substantially unique data based on artifacts of an electronic device 102 that are substantially unique to such device 102. In at least some aspects of the subject disclosure, the generated data comprises a value of a processing or storage artifact of the deice 102. For instance, an electrical, mechanical, or electromechanical process or storage operation of the device 102 can be employed to generate the value(s). The value, or a transformed identifier related thereto, can be utilized to securely represent the device, data associated with the device, or a combination thereof or of the like.

System 100 includes an electronic device 102. The electronic device 102 comprises at least one artifact that is substantially unique to the device 102 or a class of such devices (102), or that produces measurable results that are substantially unique to the device 102 or the class of such devices (102). The artifact can include any suitable procedure or operation of the device 102 that meets the above criteria. An example can include a time to process a line of code, multiple lines of code, etc. In another example, the artifact can comprise an access time, a read time and/or write time to a memory cell or a group of memory cells. In yet another example, the artifact can comprise an alternating current (AC) characteristic of a semiconductor determined, for instance, by a reciprocating loop frequency (RLF) measurement or other suitable measurement. It should be appreciated that the foregoing examples, and subject matter examples used throughout, are non-limiting. Thus, the subject disclosure and appended claims should not be interpreted as limited to the specific examples recited herein. In the above case, any suitable artifact or value derived from such artifact, that is substantially unique to a device (102) or class of such devices, is incorporated into the meaning of at least one artifact, as utilized herein.

The electronic device 102 can comprise any suitable electronic device that stores, consumes, processes and/or manipulates data. In some aspects of the disclosure, the electronic device 102 can comprise a processing device, such as a central processing unit (CPU) of a computer, a Southbridge chip, a Northbridge chip, or the like. In other aspects, the electronic device 102 can comprise an electronic storage device, such as a solid state storage device, a disk storage device, and so on. Accordingly, the subject disclosure provides for determining substantially unique values for a wide array of electronic devices (102).

The electronic device 104 can be coupled with a measurement component 104. The measurement component 104 can analyze an electronic and/or mechanical artifact of electronic device 102 and determine one or more values there from, where the values are substantially unique to the electronic device 102 or, in some aspects of the subject disclosure (e.g., in conjunction with a random arrangement of components of the device 102, see FIG. 5, infra) to a class of such devices.

In some aspects, measurement component 104 can be a hardware, software and/or firmware module coupled to a processing component of the electronic device 102 (e.g., where electronic device 102 is a processor). In other aspects, measurement component 104 can comprise a processing device (e.g., a microcontroller) in conjunction with instructions for measuring artifacts of the electronic device (e.g., where the electronic device 102 comprises solid state memory cells). For instance, measurement component 104 can be a set of instructions coupled with an onboard flash microcontroller (102) or a processing component of a computer (e.g., CPU, Northbridge, Southbridge, graphics controller, etc.). In another example, measurement component 104 can comprise a processor (e.g., CPU) of a host computer (104) that is coupled with a universal serial bus (USB) flash device (102).

System 100 can further comprise a security component 106 that receives the substantially unique value(s) (e.g., access time[s], read/write time[s], a semiconductor AC characteristic, process time[s], and/or the like) from the measurement component 104. Security component 106 can transform the value(s) into an identifier and associate the identifier with the electronic storage device. Transformation can comprise applying an algorithm or formula to the value(s) (e.g., hashing the value, encrypting the value), integrating random or semi-random seed data with the value(s), or merely rendering the measured value(s) into unit-less quantities (e.g., employing a magnitude of the value(s) and discarding measured units, such as voltage, time, charge, instructions completed or any suitable number of items in general, or the like).

In addition to the foregoing, the security component 106 can employ an algorithm to transform the identifier into an encryption/decryption key. In another aspect, the security component 106 can employ the value(s) or a transformed version of the value(s) (e.g., a hash of the value) to identify and/or verify integrity of the electronic device 102 to another device. In one instance, the value(s) or transformed value(s) can be utilized as data to identify the electronic device 102 on a network. In another instance, the value(s) or transformed value(s) can be utilized as data to identify and/or verify integrity of the electronic device 102 with a host device (e.g., computer, CPU, etc.).

As described, system 100 can provide unique identification and/or encryption of data associated with an electronic device 102. The encryption or identification can be based on substantially unique values, determined from electronic and/or mechanical artifacts of the device 102. Accordingly, system 100 can distinguish the device 102 and/or data based on such values or transformed versions thereof (e.g., identifiers).

Figure 2:
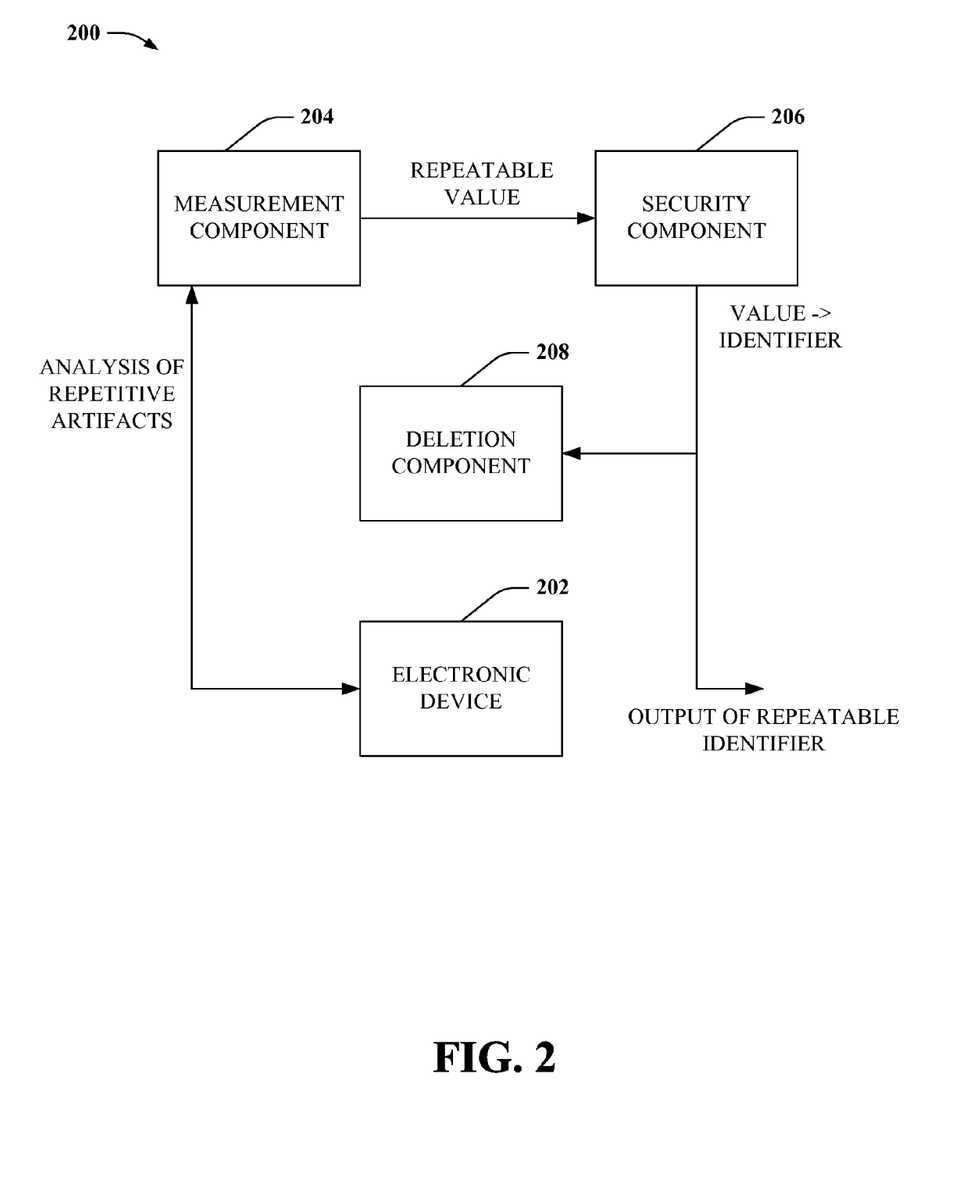
FIG. 2 depicts a block diagram of an example system that reliably regenerates unique data from artifacts of electronic devices according to some aspects.

FIG. 2 depicts a block diagram of an example system 200 that reliably regenerates unique data from artifacts of electronic devices (202) according to some aspects of the subject disclosure. Specifically, a measurement component 204 can analyze repeatable artifacts (e.g., electrical and/or mechanical aspects of processing or storage artifacts) of the electronic device 202. For instance, a characteristic of a semiconductor component of the electronic device (202) that reliably reproduces a particular value (e.g., a memory cell access time, determined within a certain tolerance) substantially unique to the electronic device 202 can be analyzed by the measurement component 204. Accordingly, the particular value can be regenerated instead of stored in persistent memory, (or, e.g., instead of being stored in any memory in some instances), reducing likelihood that the particular value can be compromised by unauthorized entities.

Measurement component 204 can provide the repeatable value to security component 206. Security component 206 can transform the repeatable value into an identifier. In some aspects of the subject disclosure, the identifier can comprise a key for an encryption/decryption algorithm. In other aspects, the identifier can be utilized to distinguish the electronic device 202 on a network. In still other aspects, the identifier can be employed to verify integrity of the electronic device with a host device (not depicted). For instance, the host device can condition data exchange with the electronic device or other computer operation (e.g., booting up a computer) upon receiving the identifier (or, e.g., the repeatable value) from the security component 206.

Once generated, the security component 206 can provide the identifier to an external device (e.g., host device, a computer, a network, a processor, etc.), maintain the identifier private to the electronic device 202, or provide the identifier to external devices and utilize the identifier at the electronic device. System 200 can further comprise a deletion component 208. The deletion component 208 can erase the identifier and repeatable value to mitigate a likelihood that the integrity of the identifier is compromised. In some aspects, deletion component 208 can erase the identifier and/or value from memory (not depicted) associated with system 200. In other aspects, the deletion component 208 can move the identifier/value out of persistent memory into volatile memory. Thus, when power is cycled at the volatile memory, the identifier/value will be erased. According to further aspects, deletion component 208 can schedule the identifier/value for deletion after a threshold time has elapsed, after use by an internal process local to the electronic device 202, after providing the identifier/value to an external device, or a combination thereof or of the like.

Thus, in some aspects of the disclosure, the identifier and value(s) need not be stored in persistent memory, or stored in memory at all. Rather, if the identifier is required by another device, to verify integrity of the electronic device, conduct data exchange, encrypt/decrypt data associated with the identifier, and so on, the value and identifier can be regenerated by system 200 and output by the security component 206. In other aspects, the identifier and value can be maintained private to the electronic device 202 and not submitted to external devices. Such can be the case if the identifier/value is utilized privately at the electronic device 202 for local encryption, master encryption, or the like (e.g., where the identifier comprises a local or master key private to the electronic device 202, used to secure other shared keys or information associated with and/or stored at the electronic device 202, or provided to other devices, or the like).

Figure 3:
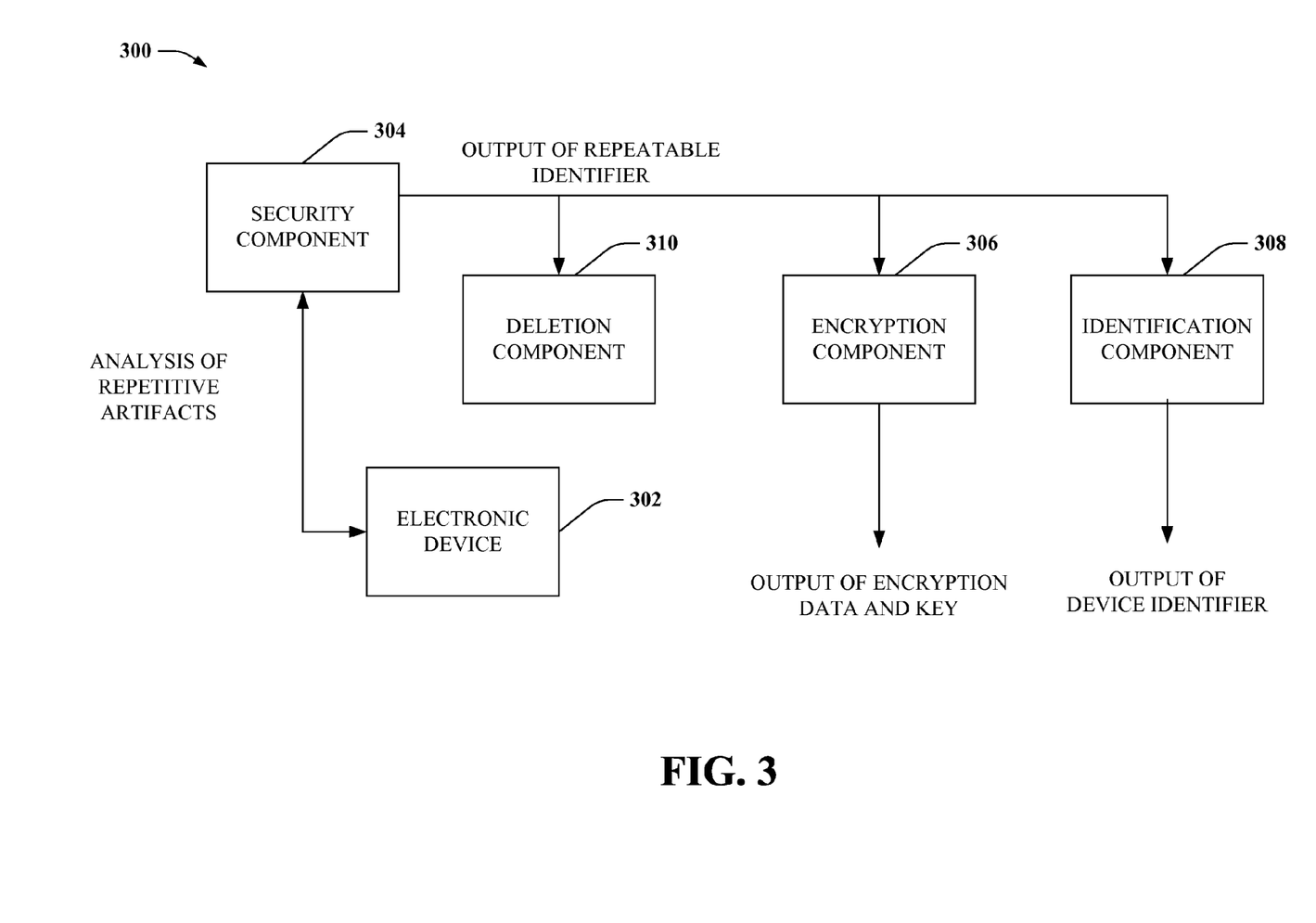
FIG. 3 illustrates a block diagram of a sample system that provides data encryption/decryption utilizing data generated from artifacts of an electronic device.

FIG. 3 illustrates a block diagram of a sample system 300 that provides data encryption/decryption utilizing data generated from artifacts of an electronic device 302. As described herein, electronic and/or mechanical artifacts of the electronic device 302 that result in repeatable values (e.g., access time, process time, read/write time, etc.) substantially unique to the device 302 can be analyzed. Such repeatable value(s) can be received at a security component 304. Security component 304 can transform the repeatable value(s) into a repeatable identifier and associate such identifier with the electronic device 302. Transformation can comprise various algorithms utilized to transform data. For instance, transformation can employ a hash function to generate a hash of the value(s). In another example, transformation can employ seed data utilized to further distinguish the value from values of other devices or potential values of a single device. For instance, a value determined from a processing or storage artifact of electronic device 302 can be integrated with a random number (e.g., based on a measurement of electronic noise associated with the artifact or device 302, a randomly generated number), a predetermined number of a set of numbers, can be hashed, or any combination thereof or of the like. Where transformation employs seed data utilized to further distinguish the value, such seed data can be stored at the device 302 (or, e.g., other devices that consume the identifier) to provide repeatability in determining the identifier.

Once determined, the repeatable identifier can be forwarded to one or more components (306, 308) that can consume the identifier in various data applications. Once provided to the one or more components (306, 308), security component 304 can forward the repeatable identifier and repeatable value(s) to deletion component 310. Deletion component 310 removes such identifier/value(s) from temporary memory (not depicted) associated with system 300.

For encryption-related purposes, the repeatable identifier can be forwarded to an encryption component 306. The encryption component 306 can utilize the identifier as a key for an encryption or decryption algorithm. Such key/algorithm(s) can be utilized to secure data associated with the electronic device 302. For instance, any data exchanged with the electronic device 302 and another device can be encrypted and decrypted utilizing the key. Alternatively, or in addition, the key can be used to secure information maintained privately at the device (e.g., not shared with other devices). In the former case, an external device can request the key from system 300, which can regenerate the repeatable identifier and key as described above. Accordingly, encryption keys need not be stored, or persistently stored in some aspects, at system 300 or other such devices, mitigating likelihood that the keys can become compromised by unauthorized entities.

For communication related purposes, the repeatable identifier can be forwarded to an identification component 308. The identification component 308 can employ the identifier to distinguish the electronic device 302 among other devices (e.g., storage devices, processors, etc.). In some aspects, the identifier can be utilized to verify that the electronic device 302 is an expected device in a system. For instance, a processing device in the system can request the identifier prior to authorizing data exchange with the electronic device 302, device initialization, or the like.

Figure 4:
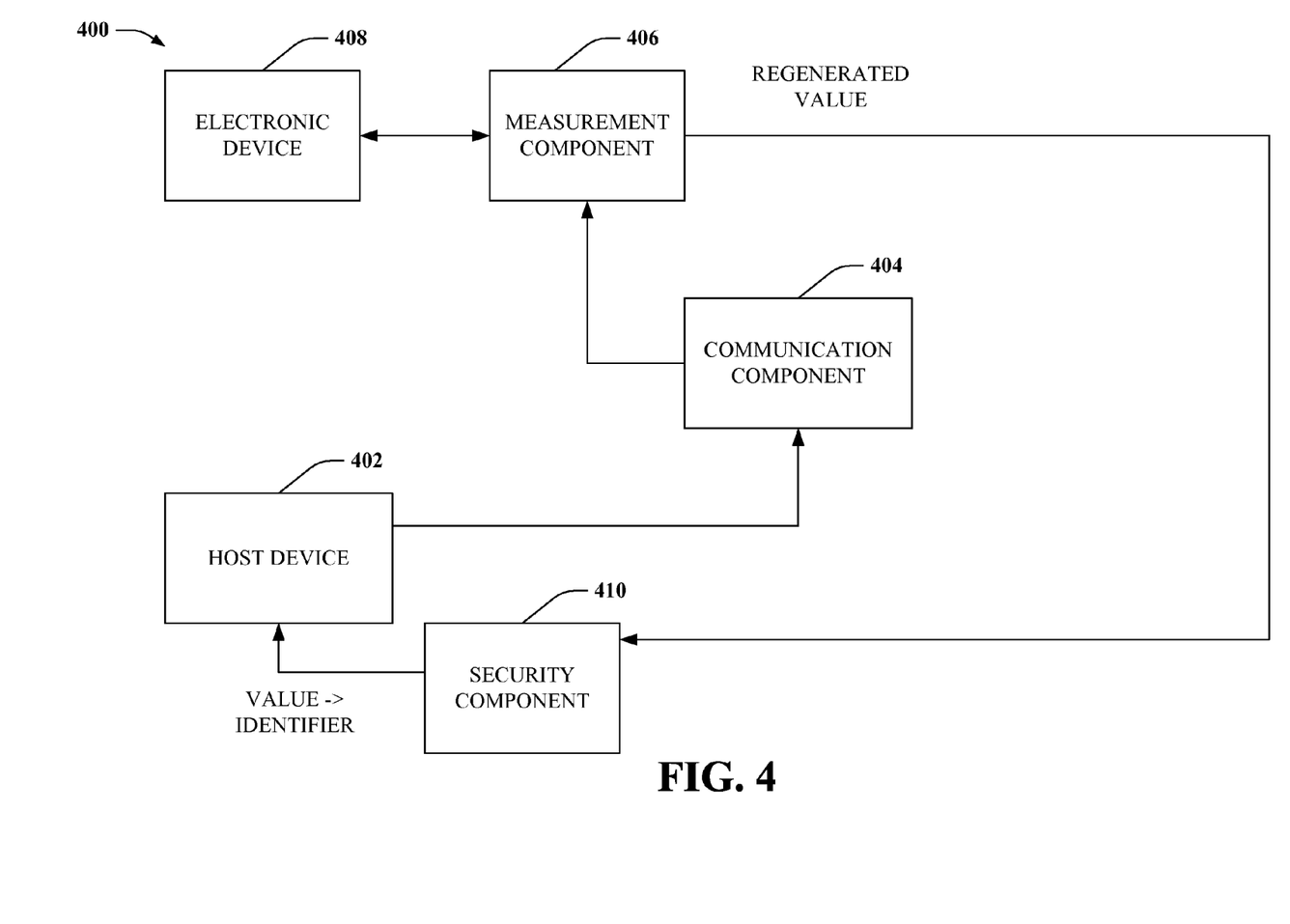
FIG. 4 depicts a block diagram of a sample system that can distinguish electronic devices on a network based on data determined from artifacts of such devices.

FIG. 4 depicts a block diagram of a sample system 400 that can distinguish electronic devices (408) in a system (400) and/or on a network based on data determined from artifacts of such devices (408). System 400 can comprise a host device 402 coupled with a communication component 404 that couples the host device 402 with an electronic device 408. The communication component 404 can be any suitable mechanism for exchanging data. Examples can include a wired connection such as a bus, a USB connection, an Ethernet connection and/or the like. Other examples can include a wireless connection such as a wireless local area network (WLAN) connection, a Bluetooth® connection, a cellular connection, a near field communication (NFC) connection, a wide area network (WAN) connection and/or the like. In further examples, communication component 404 can comprise a wired and wireless connection.

Host device 402 can send a request for data to electronic device 408 via communication component 404. For instance, the host device 402 can request data from the electronic device 408 that is substantially unique to the electronic device 408. Such data can be utilized to verify identity of the device (408), encrypt/decrypt data associated with a selected encryption algorithm and key, or the like.

Once the electronic device 408 receives the request from the host device 402, measurement component 406 can analyze an artifact of the electronic device that reliably and repeat-ably results in data substantially unique to the electronic device 408. The data can be forwarded to a security component 410 associated with the host device 402. The security component 410 can comprise an encryption/decryption engine, a network firewall, a computer security module, and/or the like.

As a particular example, host device 402 can comprise a computer, electronic device 408 can comprise a solid state memory device (e.g., USB flash device), and communication component 404 can comprise a USB data connection. When the solid state memory device (408) is coupled to the computer (402) over the USB data connection (404), the computer (402) can request data unique to the electronic device 408. Receipt of a predetermined response from the request can be a condition to initializing the solid state memory device (408) with the computer (402). Accordingly, measurement component 406 can analyze and generate data from one or more artifacts of the solid state memory device (408), where such data is substantially unique to the solid state memory device (408). The data is transferred to the security component 410, and transformed as needed by the computer (402) (e.g., into a data string used to verify identity of the solid state memory device at the computer). If the proper data is received at the computer (402), the solid state memory device (408) can be initialized at the computer (402); otherwise, data exchange with the device (408) can be blocked by the security component 410.

Figure 5:
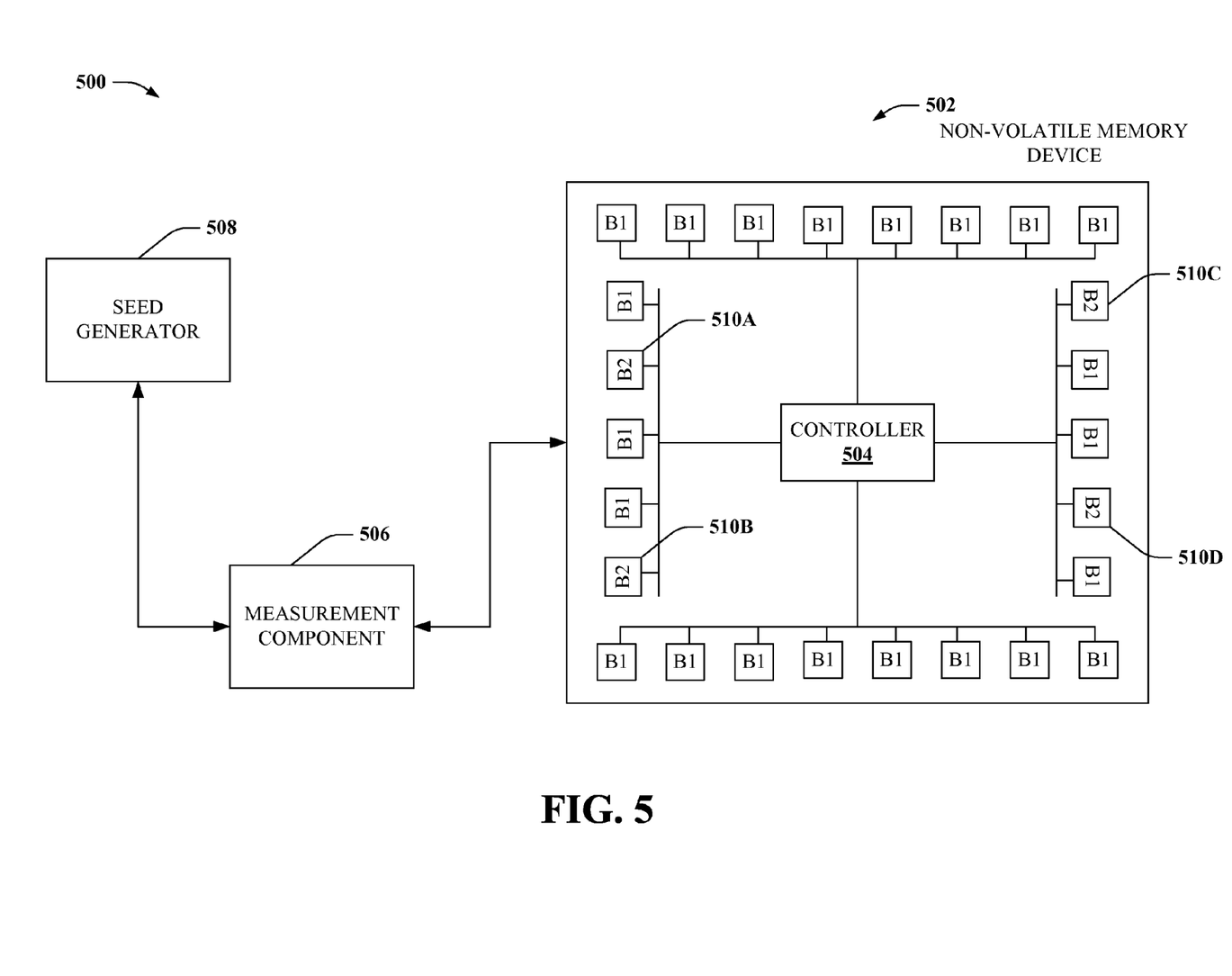
FIG. 5 depicts an example memory device that comprises one or more electronic or mechanical artifacts that generate reliably repeatable values or data.

FIG. 5 depicts an example system 500 comprising a memory device (502) that comprises one or more electronic or mechanical artifacts that generate reliably repeatable values or data. The values or data can be unique among a class of such memory devices (502). A class of memory devices (502) can comprise suitable memory devices (502) of a common manufacturer's model, a common type of memory device (e.g., a flash device), or the like. Analysis of the artifacts can be applied to a selected arrangement of components of the memory device (502) to generate data unique to the particular memory device (502). Accordingly, such data can be utilized to distinguish the device 502 among other devices (e.g., on a network), encrypt/decrypt data, and so on.

System 500 includes a non-volatile memory device 502, which can comprise any suitable solid state memory device, such as flash memory. The non-volatile memory device 502 comprises a microcontroller 504 and multiple memory cells or blocks of memory cells (B1, B2). The microcontroller 504 can perform typical tasks related to solid state memory, such as reading data from blocks of memory (B1, B2), writing to such blocks of memory (B1, B2), erasing such blocks of memory (B1, B2), and so on.

System 500 can further comprise a measurement component 506 that can analyze one or more artifacts of the non-volatile memory device 502. Such artifacts can include any suitable task performed by the microcontroller 504. Where results of such artifacts (e.g., an access time) are substantially similar among multiple memory devices (502) such as a class of devices, measurement component 506 can obtain seed data provided by a seed generator 508. The seed generator 508 can determine seed data from a random number algorithm, from electronic noise associated with operation of the non-volatile memory device 502, or other suitable mechanism.

Measurement component 506 can employ the seed data to identify an arrangement of components of the non-volatile memory device for analysis. For instance, the seed data can be utilized to select one or more blocks of memory cells B2 510A of all memory cells (B1, B2) associated with the non-volatile memory device 502. Analysis of artifacts common to a class of memory devices (502) can be applied to the arrangement of components to produce a value or values (e.g., read time, write time) substantially unique to a particular non-volatile memory device 502. Accordingly, such value(s) can then be utilized to distinguish the non-volatile memory device 502 from other electronic devices (e.g., in a network, in a system). In other examples, such value(s) can be employed to generate a unique encryption key to encrypt/decrypt data, as described herein. The value(s) can be deleted once provided to another device, and regenerated as needed utilizing the seed data. Thus the value(s) need not be stored in memory, providing additional security for such encryption keys.

The aforementioned systems have been described with respect to interaction between several components. It should be appreciated that such systems and components can include those components or sub-components specified therein, some of the specified components or sub-components, and/or additional components. For example, a system could include electronic device 102, measurement component 104, encryption component 306, and communication component 404, or a different combination of these and other components. Sub-components could also be implemented as components communicatively coupled to other components rather than included within parent components. Additionally, it should be noted that one or more components may be combined into a single component providing aggregate functionality. For instance, encryption component 106 can include identification component 108, or vice versa, to facilitate generating an encryption/decryption key and a device identification data from an identifier by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 6:
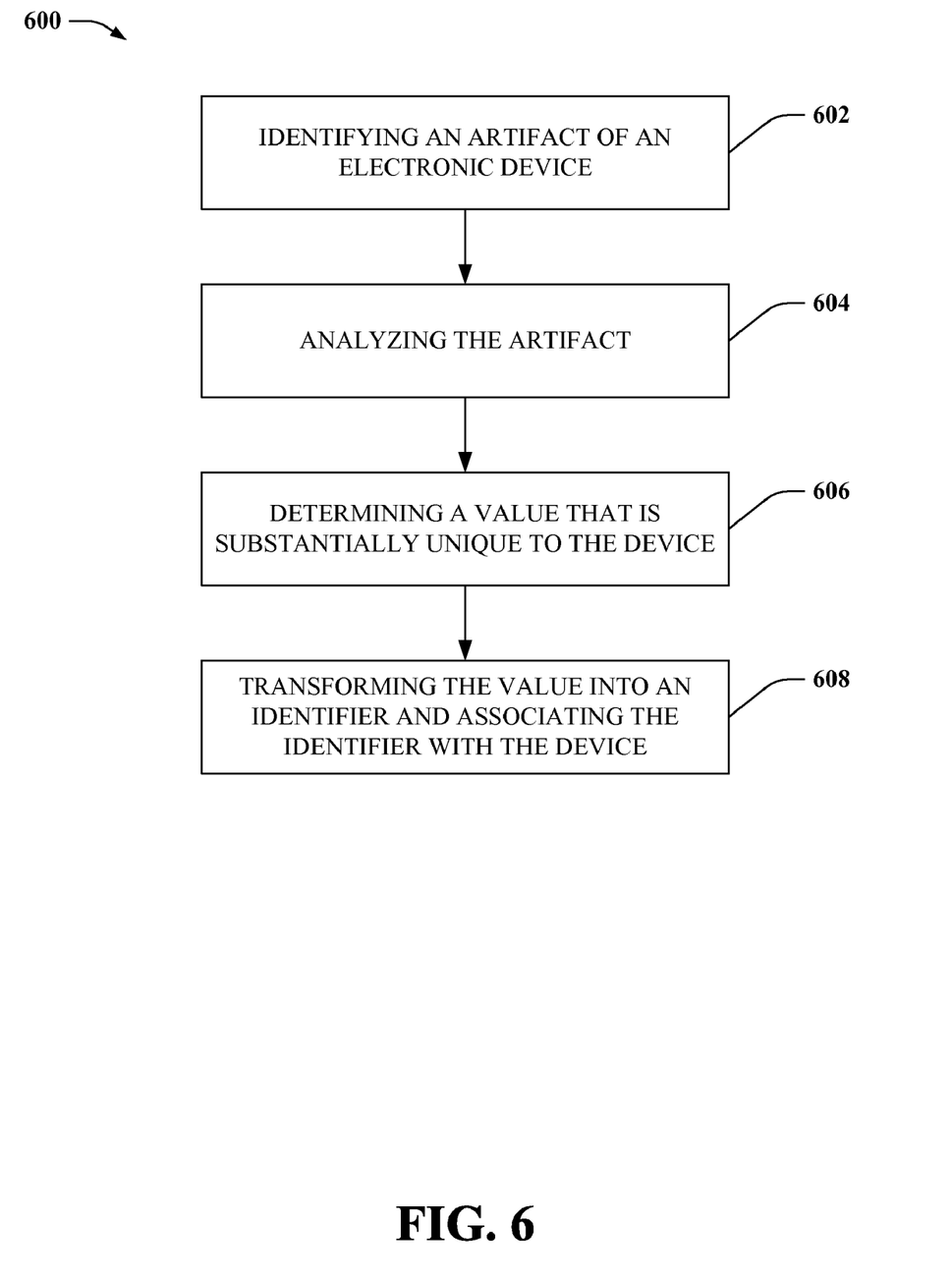
FIG. 6 illustrates a sample methodology for providing substantially unique data by analyzing artifacts of electronic devices according to aspects of the disclosure.
Figure 7:
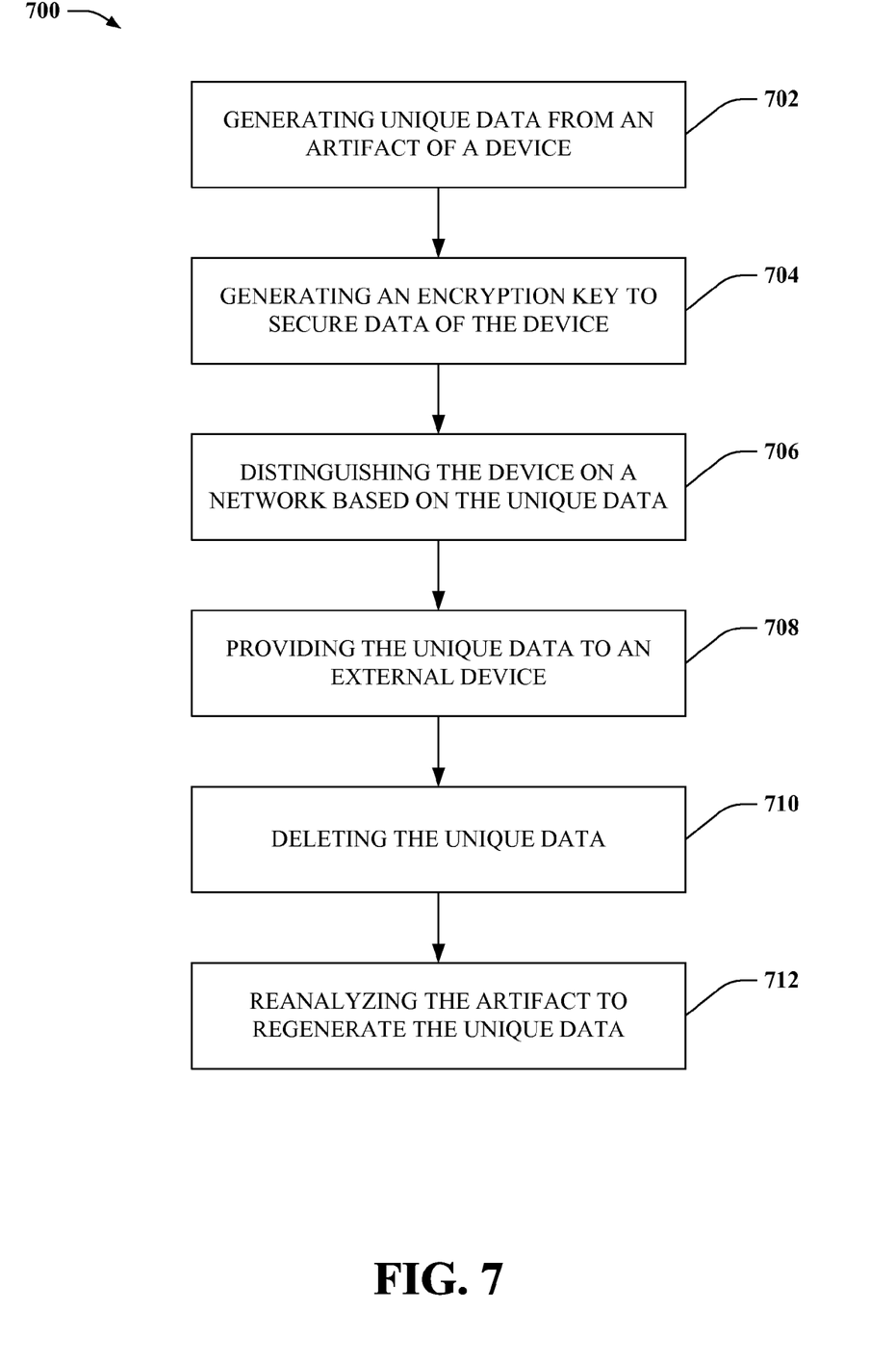
FIG. 7 depicts an example methodology for reliably and repeat-ably generating substantially unique data from artifacts of electronic devices.
Figure 8:
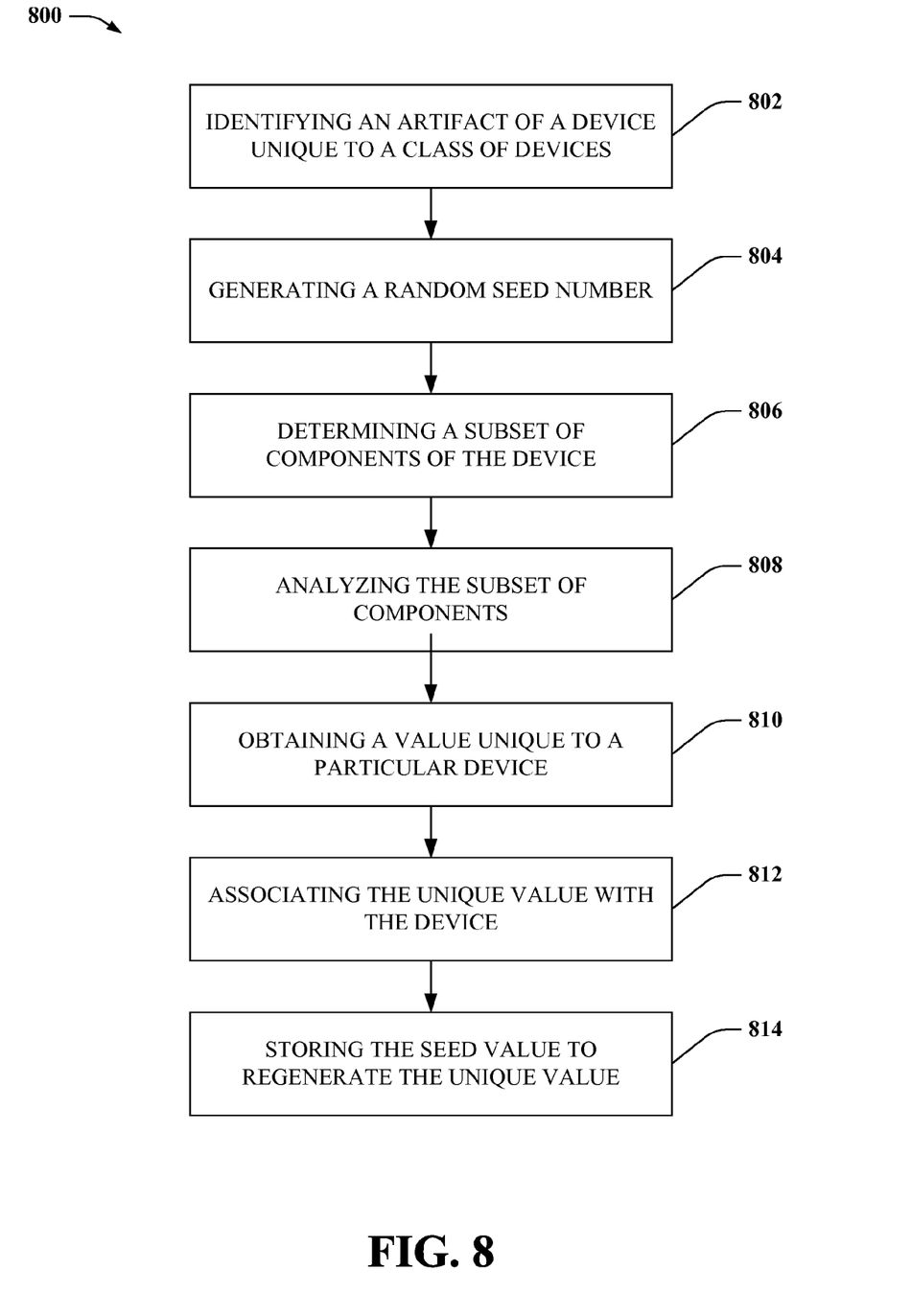
FIG. 8 illustrates an example methodology for providing unique data for encryption/decryption and/or remote communication.

In view of the exemplary systems described sura, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or media.

FIG. 6 illustrates a sample methodology 600 for providing substantially unique data by analyzing artifacts of electronic devices according to aspects of the disclosure. At 602, method 600 can identify an artifact of an operational component of an electronic device. The operational component can be a processing and/or storage aspect of the electronic device. For instance, the operational component can comprise reading data from memory, writing data to memory, accessing a memory cell(s) (or block[s] of cells), erasing data, and/or the like in conjunction with a storage aspect. Alternatively, or in addition, the operational component can comprise a response time, execution time, and so on, in conjunction with a processing aspect. The artifact can comprise one or more selected instances of the operational component, such as a read time(s), write time(s), access time(s), erase time(s), execution time, a stored charge level or a voltage level (of one or more selected cells or blocks of cells), or a combination thereof or of the like.

At 604, method 600 can analyze the artifact. The analysis can comprise measurement of selected artifacts of the electronic device. At 604, method 600 can determine one or more values resulting from the analysis that are substantially unique to the particular device. At 608, method 600 can transform the value(s) into an identifier and associate the identifier with the electronic device. Transformation can involve hashing the value(s) by employing a hash function. In some examples, transformation can involve generating an encryption/decryption key from the identifier by employing a suitable algorithm for generating encryption keys from data. In other examples, the identifier can be transformed into data that uniquely identifies the storage device from other electronic devices, or other storage devices. According to another example, transformation can simply comprise changing a measured unit into a unit-less quantity or quality (e.g., changing a 0.05 millivolt voltage measurement into a unit-less quantity, such as 0.00005). In some aspects, identification/identifier association can be utilized to distinguish the storage device on a network, verify integrity of the storage device in a system, or the like.

It should be appreciated that the operational components and/or artifacts can reliably and repeat-ably regenerate the value(s) discussed above (e.g., within a particular tolerance). Further, such value(s) can be reliably distinguishable from other values generated by similar analysis of other storage devices or electronic devices in general. Accordingly, such value(s) need not be stored to facilitate additional identification of the storage device and/or generation of encryption/decryption keys, and so on. Thus, security associated with such applications can be improved by method 600.

FIG. 7 depicts an example methodology 700 for reliably and repeatably generating substantially unique data from artifacts of electronic devices. At 702, method 700 can generate substantially unique data from an artifact of an electronic processing or storage device, as described herein. The artifact can be selected such that it reliably reproduces the substantially unique data. At 704, method 700 can generate an encryption and/or decryption key. The key can be utilized, in conjunction with a suitable encryption/decryption algorithm (s), to encrypt and/or decrypt data associated with the electronic storage device (or, e.g., associated with another device). Associated data can comprise data stored at the electronic device, consumed at the electronic device, transformed at the electronic device, forwarded to another device, and so on.

At 706, method 700 can distinguish the device on a network based on the substantially unique data. For instance, the data can be employed to identify the device. Identification can be utilized in addressing and routing data on the network. In other aspects, the data can be employed to assure integrity of the device by mitigating a likelihood that the device is not swapped with another similar device on the network (or, e.g., in a system).

At 708, method 700 can provide the substantially unique data to an external device. Such device can be a network controller, network router, or another endpoint device on the network, or a combination of these and like devices. In other aspects of the disclosure, the data can be provided to a host device in conjunction with identifying the storage device or determining integrity of the storage device. In still other aspects, the data or a version thereof (e.g., an encryption/decryption key) can be provided to another device to facilitate secure data exchange.

At 710, the substantially unique data can be deleted from temporary memory associated with the storage device. Accordingly, likelihood that the data can be extracted from such memory by an unauthorized entity is reduced. At 712, method 700 can reanalyze the artifact to regenerate the unique data. Such re-analysis can be based on a request from an external device (e.g., a host processing device, a network device, a secure data exchange participant). A response to the request that provides the substantially unique data can facilitate additional secure communication, additional identification/verification of the storage device, and so on, as described herein.

FIG. 8 illustrates an example methodology 800 for providing unique data, generated from artifacts of an electronic device, for encryption/decryption and/or remote communication. At 802, method 800 can identify an artifact of a device that can generate data substantially unique to a class of electronic devices. For instance, method 800 can store information pertaining to expected data resulting from various types of devices (e.g., processing time, read time, write time, etc. substantially common to a group or class of devices). By testing the artifact of the device, results can be compared with the stored information to identify whether such results match one or more groups or classes of devices.

At 804, method 800 can generate a random seed number. The random seed can be generated by employing a random number generator. According to at least some aspects of the disclosure, the random seed can be generated by analyzing one or more substantially random aspects of the electronic storage device (e.g., electronic noise). At 806, method 800 can determine a subset of components of the electronic storage device for analysis. At 808, the artifact common to the group or class of devices can be analyzed for the subset of components. At 810, a value unique to the particular device can be obtained from analysis of the artifact for the subset of components. At 812, method 800 can associate the value with the device. At 814, the random seed can be stored to regenerate the unique value. Accordingly, the value can be deleted to mitigate likelihood that such value can be compromised by unauthorized entities. Applications that utilize the unique value, such as encryption/decryption, device identification or verification, and so on, can request regeneration of the value based on the random seed, as described above.

Figure 9:
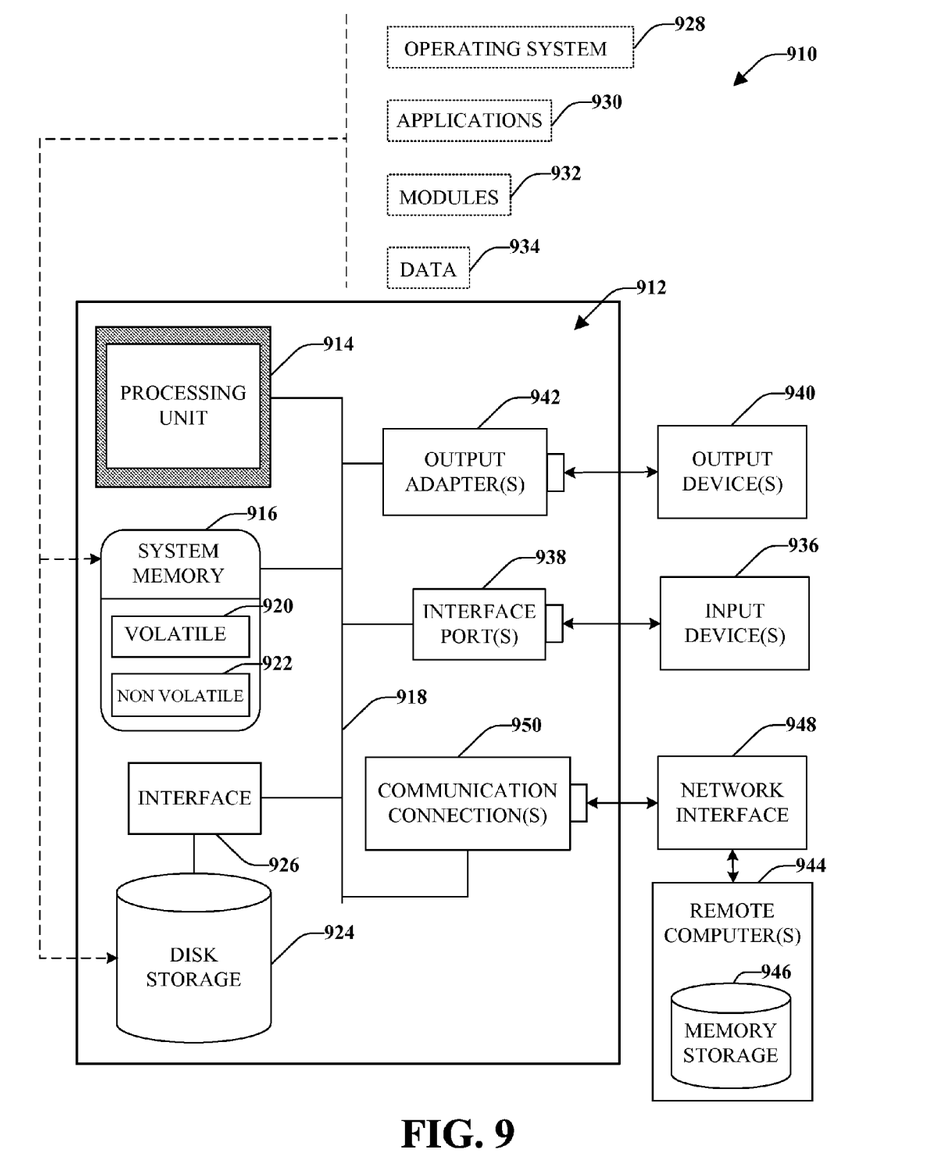
FIG. 9 illustrates a sample operating system that can provide device analysis and data determination for aspects of the subject disclosure.
Figure 10:
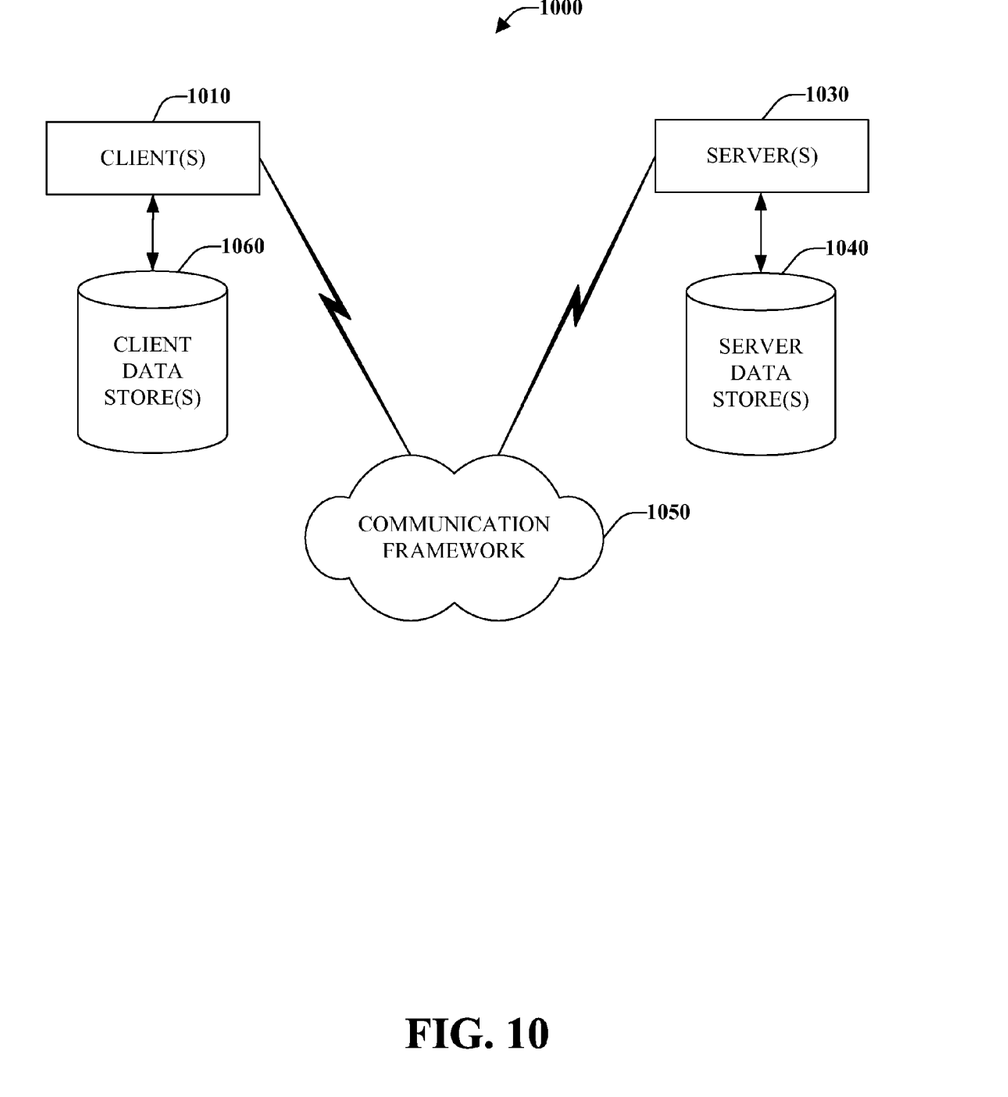
FIG. 10 depicts an example network architecture that can provide remote communication in conjunction with aspects of the subject disclosure.

In order to provide additional context for various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules.

Generally, program modules include routines, programs, components, data structures, etc. that can perform particular tasks and/or implement particular abstract data types. Such tasks can include analyzing artifacts of electronic devices, generating values from such analysis, employing values in encryption/decryption, employing values in generating substantially unique identification data, providing such data on request of external devices, and so on, as described herein. Further, relevant tasks can include identifying reliably reproducible artifacts of electronic devices, employing seed data to differentiate results of such artifacts that are common to a class of devices, or the like, as described herein. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices, described below.

With reference to FIG. 9, an exemplary environment 910 for implementing various aspects disclosed herein includes a computer 912 (e.g., desktop, laptop, server, hand held, programmable consumer or industrial electronics . . . ). The computer 912 includes a processing unit 914, a system memory 916, and a system bus 918. The system bus 918 can couple system components including, but not limited to, the system memory 916 to the processing unit 914. The processing unit 914 can be any of various microprocessors, such as dual microprocessors, quad microprocessors, and other multiprocessor architectures suitable for a computer environment 910.

The system bus 918 can be any of several types of suitable bus structure(s) including the memory bus or memory controller, a peripheral bus or external bus, and/or a local bus using any suitable variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922 (including electrically addressable non-volatile memory, referred to as non-volatile memory above). The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example, disk storage 924. Disk storage 924 includes, but is not limited to, devices such as a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It should be appreciated that any of the foregoing processor, interface, memory, or like devices can be utilized in conjunction with aspects of the subject disclosure. For instance, substantially unique data can be generated as described herein for any of the foregoing processors, memory modules, disk drives, interface devices, and/or like components of system 900 or like systems. Thus, by employing aspects of the subject disclosure, secure data exchange, identification/verification of such components, etc., can be conducted by system 900.

It is to be appreciated that FIG. 9 describes software that acts as an intermediary between users and the basic computer resources described in operating environment 910. The software can include various rules for implementing aspects of the subject disclosure, such as generating encryption/decryption keys, storing information pertaining to artifacts common to a class of devices, analyzing artifacts of devices to generate data substantially unique to such devices, utilizing seed data to randomize results of artifacts common to groups of devices, and so on as described herein. Such software can include an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user can enter commands or information into the computer 912 through input device(s) 936. Input devices 936 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 can utilize some of the same type of ports as input device(s) 936. Thus, for example, a USB port may be used to provide input to computer 912 and to output information from computer 912 to an output device 940. Output adapter 942 is provided to illustrate that there are some output devices 940 like displays (e.g., flat panel and CRT), speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and can typically include many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems, power modems and DSL modems, ISDN adapters, and Ethernet cards or components.

FIG. 10 is a schematic block diagram of a sample-computing environment 1000 with which the present invention can interact. For instance, the environment 1000 can be suitable to provide a remote interface between one or more host devices and/or applications and an electronic storage device, processing device, network component, etc., as described herein. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the present invention, for example. One possible communication between a client 1010 and a server 1030 may be in the form of a data packet adapted to be transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A system that generates data from an artifact of an electronic device, comprising:
 a processor;
 a memory, communicatively coupled to the processor, the memory comprising components including:
  a communication component that receives a first request from an external device to identify the electronic device that is part of a particular class of devices;
  a measurement component that, responsive to the first request to identify the electronic device, analyzes a processing or storage artifact of the electronic device and determines a value associated with the processing or storage artifact that is substantially unique to the electronic device; and a security component that compares the value to stored value information expected for the particular class of devices, transforms the determined value into an identifier when the comparison results in an acceptable match, associates the identifier with the electronic device, and provides the identifier to the external device instead of storing the identifier in persistent memory associated with the electronic device, wherein, subsequent to providing the identifier to the external device, the communication component receives a second request from the external device or another external device to identify the electronic device and instructs the measurement component to re-determine the value by re-analyzing the same processing or storage artifact of the electronic device.

2. The system of claim 1, further comprising an encryption component that utilizes the identifier as a key for an encryption or decryption algorithm to secure data associated with the electronic device.

3. The system of claim 1, further comprising an identification component that employs the identifier to distinguish the electronic device among other electronic devices.

4. The system of claim 1, wherein the communication component receives a third request to encrypt or decrypt data and instructs the measurement component to re-determine the value by re-analyzing the same processing or storage artifact of the electronic device.

5. The system of claim 1, the identifier is transformed, at least in part, by extracting a unit-less quantity from the determined value.

6. The system of claim 1, the processing or storage artifact comprises a repeatable procedure employed in operation of the electronic device.

7. The system of claim 1, the processing or storage artifact comprises at least one of:
 a read time;
 a write time;
 an erase time;
 an access time;
 a stored charge level; or
 a voltage level, or a combination thereof, of one or more memory cells or blocks of memory cells.

8. The system of claim 1, further comprising a seed generator component that generates random seed data for the processing or storage artifact that is substantially unique to the electronic device, the measurement component being configured to use the random seed data to identify an arrangement of one or more blocks of memory cells of the electronic device and render the identifier unique to the electronic device.

9. The system of claim 1, wherein the external device is an external network device that requests to identify the electronic device for addressing and routing data on a network.

10. A method of securing data associated with an electronic device, comprising:
 identifying an artifact of an operational component of an electronic device of a particular type;
 analyzing the artifact;
 determining a value of the artifact from the analysis that is substantially unique to the electronic device;
 comparing the value to stored information relating to common values expected for a group of electronic devices of the particular type;
 when the comparison yields a matching result, transforming the value into an identifier and associating the identifier with the electronic device;
 providing the identifier directly to an external device instead of storing the identifier in persistent memory associated with the electronic device;
 subsequent to providing the identifier to the external device, receiving a request to re-determine the value by re-analyzing the same artifact.

11. The method of claim 10, further comprising employing the identifier to distinguish the group of electronic devices of the particular type from other groups of electronic devices of a different type.

12. The method of claim 10, further comprising employing the identifier as a key for encryption or decryption of data.

13. The method of claim 10, further comprising
 employing the identifier privately at the electronic device to secure local data or processes, or secure a shared encryption key.

14. The method of claim 10, further comprising determining the value, transforming the value into the identifier and providing the identifier in response to a request for a key to encrypt/decrypt data.

15. The method of claim 10, wherein the external device is an external network device that requests to identify the electronic device for addressing and routing data on a network.

16. A system that generates substantially unique data from electronic or mechanical artifacts of an electronic device, comprising:
 a processor;
 at least one memory, communicatively coupled to the processor, the at least one memory comprising components including:
  a communication component that receives a first request from an external device to identify the electronic device as an authorized member of a particular class of devices;
  a measuring component that determines an operational procedure of the electronic device having an artifact substantially unique to the electronic device and analyzes the operational procedure to quantify an aspect of the artifact;
  a security component that compares the quantified aspect to stored information indicating common quantified aspects expected for the particular class of devices, transforms the quantified aspect into an identifier, and provides the identifier to one or more applications at a different network location without storing the identifier so that the one or more applications distinguish the electronic device from other electronic devices at a first point in time,
 wherein, subsequent to providing the identifier to the one or more applications, the communication component receives a second request to identify the same electronic device and instructs the measuring component and the security component to generate another identifier for the same electronic device at a second point in time.

* * * * *